Sept. 26, 1967     L. E. MADANSKY     3,343,290
AIRCRAFT PANEL
Filed June 16, 1965     3 Sheets-Sheet 1
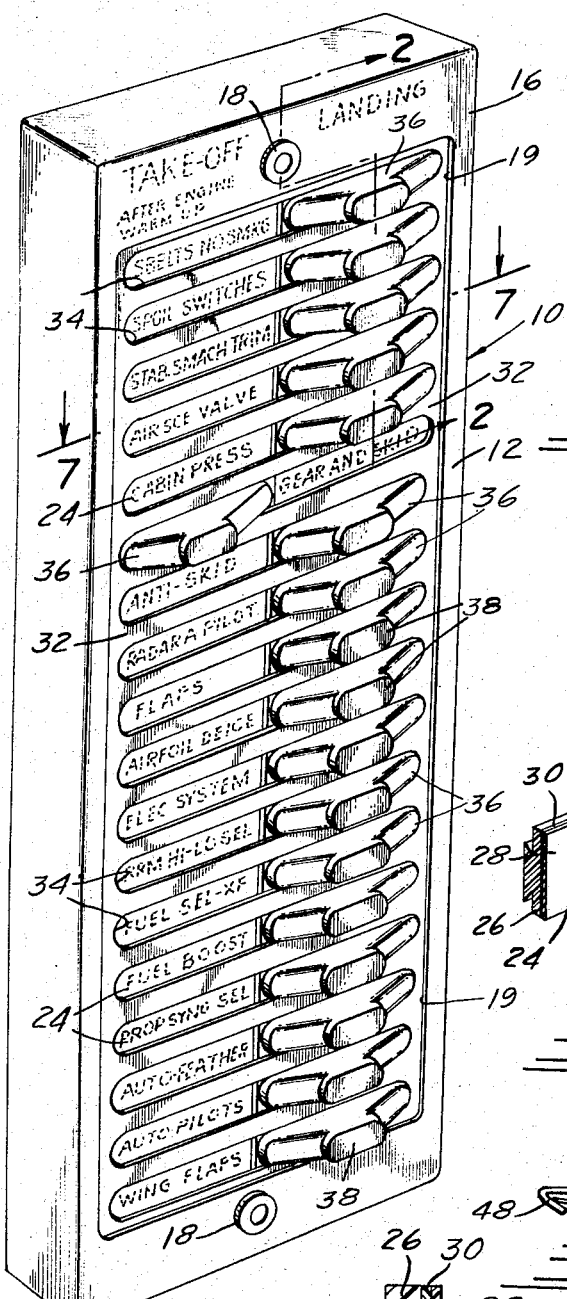
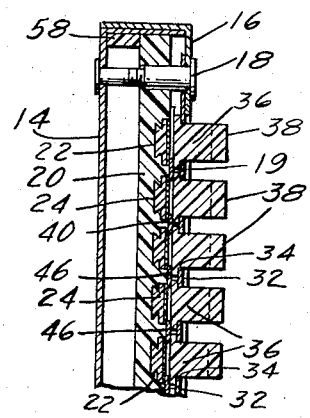
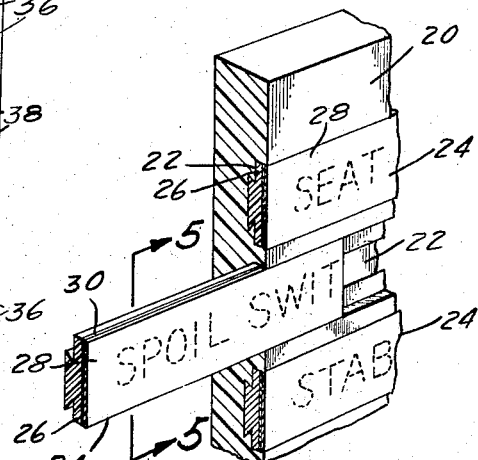
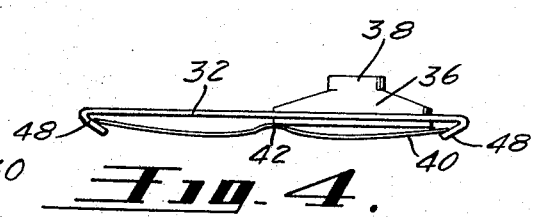
INVENTOR.
Leslie E. Madansky
BY
ATTORNEYS

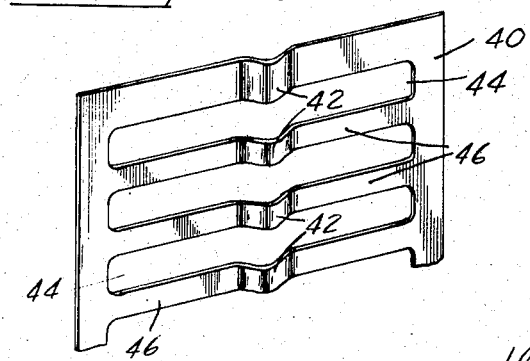
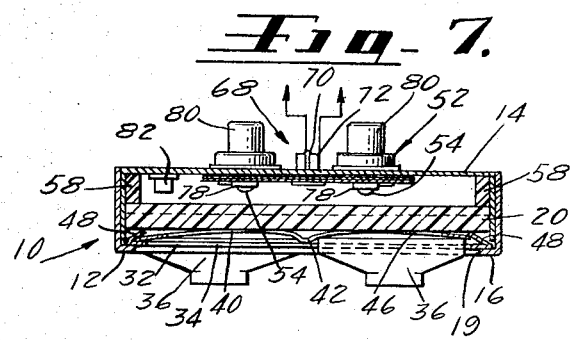
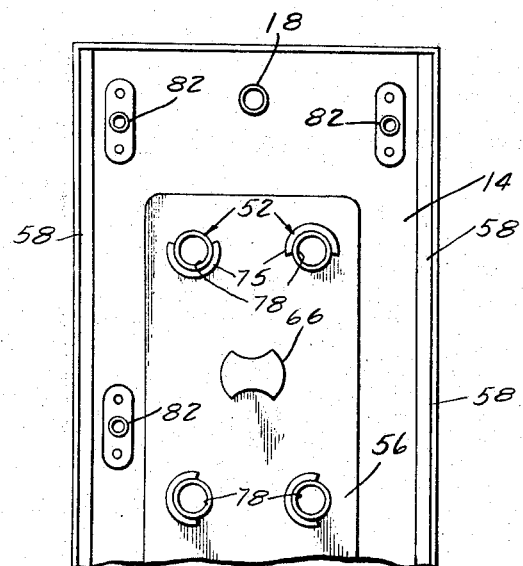
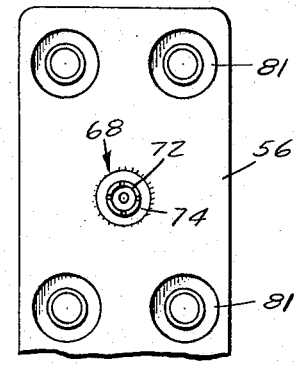
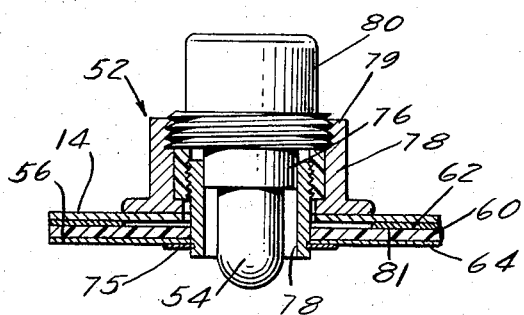
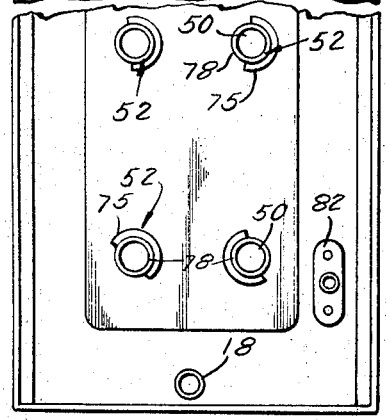

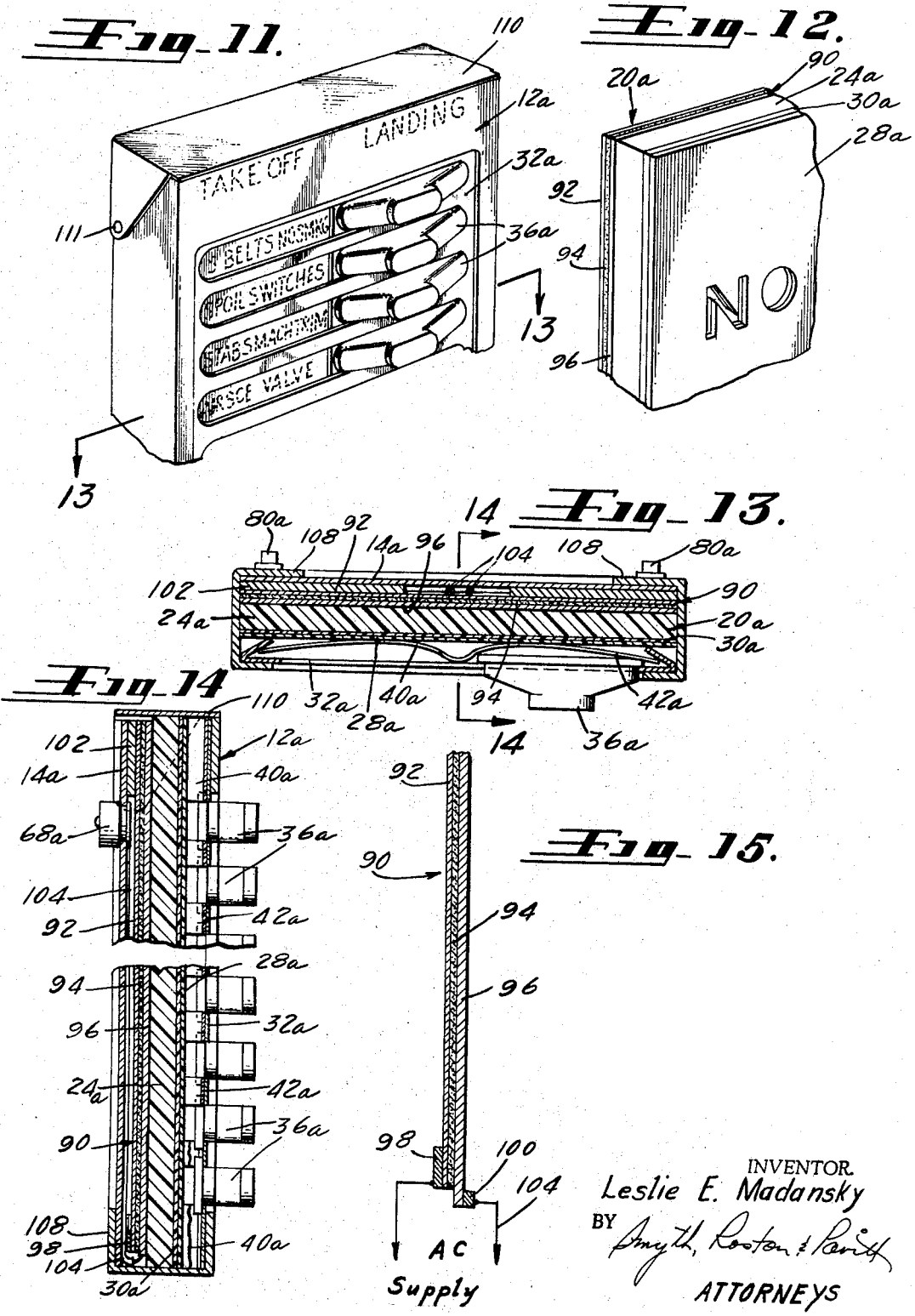

3,343,290
AIRCRAFT PANEL
Leslie E. Madansky, Burbank, Calif., assignor to California Plasteck, Inc., Reseda, Calif., a corporation of California
Filed June 16, 1965, Ser. No. 464,308
8 Claims. (Cl. 40—62)

This invention relates to devices used in aiding an aircraft pilot in take-off and landing procedures.

It is customary for the pilot of an aircraft to have a check list of various items to remind him of what he must do for proper take-off and landing procedures so that none of the operations for proper take-off and landing are overlooked. Such a list will contain, for example, reminders to check items relating to the craft itself, such as, stabilizer aileron and rubber trims, the engine fuel pump heater as well as other miscellaneous items such as seat belt light, exit lights, no smoking light, etc.

The present-day check lists are in the form of one or more typed or mimeographed sheets of paper which may be clipped either directly on the instrument panel or on a clip board to be used each time the aircraft is flown.

Another form of check list is to imprint the necessary items on a continuous roll of paper incorporated in a hand operated roller device by which the pilot may revolve the continuous roll so that each of the items will be checked off as they come to his attention.

One of the deficiencies in the presently used check lists is that the paper, whether clipped on the instrument panel or clipped on the clip board, often becomes lost, badly crumpled or illegible through constant usage. Too, it is possible that the clip board itself may become misplaced.

While some of these deficiencies may be overcome by the above mentioned roll type check list, it, too, is subject to tearing and malfunctioning, for example, by slippage of the roll on the rollers. This latter, of course, is particularly bad if it occurs at a time when it is needed the most as, for example, during landing.

Still another deficiency in these presently used check-off lists is that they are not illuminated with the result that light, such as a lamp, must be used for visual reference to the list during night flying.

Still another and perhaps the most important deficiency is that these check lists have no way to immediately visualize which of the items have been overlooked with the result that it is often necessary to repeat some or all of the operations to insure none are overlooked.

The present invention overcomes the above deficiencies by the concept of listing the check-off items in vertical adjacent columns—one for take-off and one for landing—and covering the items in one column or the other with individual tabs slidable horizontally between adjacent columns. Thus, when taking off, for example, all the items in one column, the take-off column will be exposed to view and all the items in the other column will be covered by the tabs. As the pilot goes through the take-off procedure, he simply slides the tabs in one column one at a time across to the other column. It can be appreciated that there is an immediate visual reference to the items checked off and the items not checked off by the position of the tab with respect to the column. It can also be appreciated that another and important feature of this invention is that the check list is immediately ready for the next procedure, such as the landing procedure, simply because the previous checkout procedure reverses the position of the tabs and exposed the landing list of items to view.

In one practice of this invention, the check list items comprise removable inserts mounted on a translucent, relatively flat, rectangular panel or main plate, preferably of plastic material, all of which are encased in a box-like container. The tabs are slidably mounted on a panel cover member which has a plurality of horizontal slots wide enough to expose substantially the width of the insert, or at least the lettering on the insert, and long enough to expose two horizontally adjacent inserts so that as the tabs are moved back and forth in the slot, alternatively, one or the other of the two adjacent horizontal inserts will be exposed.

In this practice of this invention, means are also provided to illuminate the lettering on the inserts so that the items to be checked off will be seen in darkness as well as in daylight. As mentioned above, this is an important improvement over present check lists which must be illuminated from an outside source and this improvement is accomplished in this invention by providing a light source behind the mounting panel so that light will pass through the translucent mounting panel and through the lettering on the inserts. The lettering on the inserts, so as to be visible at night when illuminated by the translucent panel can be accomplished in several ways. The conventional manner, however, is to provide an inner layer or base of translucent material with a second layer of light reflective translucent material such as white vinyl which, in turn, is covered with an apaque outer layer of vinyl. The opaque outer layer is then cut or etched to form the lettering with the white layer exposed. Thus, when the translucent mounting panel is back-lighted, the light, shining through the lighting panel and through the lettering on the inserts, will be visible in darkness.

Of course, the back-lighted translucent mounting panel illuminates the lettering of all of the inserts whether covered by the slidable tabs or not, but the tabs, being opaque, block the covered tabs from the view of the pilot so that only the uncovered inserts can be seen. It is these uncovered inserts that the pilot views as the list of items to be checkel during the landing or take-off procedure.

In order to illuminate the translucent mounting panel and the lettering on the inserts in this practice of the invention, the device is provided in one embodiment with a plurality of small lights mounted on the back cover of the box-like container in positions so that the plastic mounting panel is completely and evenly lighted.

This practice of the invention utilizes a unique manner of providing current to the aforesaid light bulbs by the use of a flat conductor plate comprising two layers of conductors separated by a layer of nonconductive material, which plate is electrically connected to all of the light bulb sockets and a to source of power. This plate eliminates the need for wiring or printed circuits to connect the light bulbs to a source of power and in that way provides a connecting means which is inexpensive, yet reliable.

In another practice of the invention, the check list items are formed as lettering cut-outs directly on a laminated panel which has a relatively thick main layer of translucent material and an outer or front layer of opaque material separated by an intermediate layer of light reflecting translucent material, which layer is exposed through the cutouts of the opaque layer. The method of forming this panel is preferably the method disclosed and claimed in the U.S. application for patent, Ser. No. 201,425 of Leslie E. Madansky, entitled, "Method of Fabricating Edge-Lighted Panels," filed June 11, 1962.

This latter practice of the invention differs in one aspect from the previous practice in that the lettering is directly on the panel rather than lettering on inserts fitted into a translucent mounting panel, but the lettered lists of items are still in vertical column side by side and spaced vertically to cooperate with the same type of slidable tabs as previously described.

In this latter practice of the invention, another means for lighting the check list is provided and this is accomplished by laminating an electroluminescent device to the back face of the panel so that the glow from this electroluminescent device will back-light the panel so that the check list is visible in darkness. This electroluminescent device is formed in a well-known manner which comprises providing a layer of aluminum foil, a layer of phosphorescent material and transparent conductive layer such as a layer of tin fluoride, said layer of phosphorescent material being sandwiched between the other two layers, with all layers preferably encased in a thin cover of Teflon. On the aluminum foil layer and on the tin fluoride suitable electrical connections are made to connect this device to a source of electrical alternating current so that the phosphorescent material will glow when activated by the electrical current and illuminate the main panel.

In this latter practice of the invention, there is another refinement incorporated therein which comprises forming the container in which the panel and light source are disposed with one end or side which is removable so that the panel and the electroluminescent device may be removed to change the lettering or to replace the panel as desired. Of course, in this embodiment, suitable electrical wiring is provided which will permit the electroluminescent device to be withdrawn from the container to allow the panel to be worked on or disconnected, as the case may be.

Other and additional advantages and features of the present invention will become apparent from a more detailed description of the drawings, wherein:

FIGURE 1 is a perspective view of the check list device formed in accordance with one teaching of this invention;

FIGURE 2 is a cross-sectional view taken along line 2—2 of FIGURE 1 and looking in the direction of the arrows;

FIGURE 3 is a detailed perspective view of a portion of the mounting panel showing one of the inserts partially removed from the mounting panel;

FIGURE 4 is a cross-sectional view of the slidable tab insert cover plate and illustrated with one of the tabs held therein;

FIGURE 5 is a cross-sectional view of one of the inserts taken along line 5—5 of FIGURE 3 and looking in the direction of the arrows;

FIGURE 6 is a perspective view of the spring plate to bias the slidable tabs;

FIGURE 7 is a cross-sectional view taken along line 7—7 of FIGURE 1 and looking in the direction of the arrows;

FIGURE 8 is a plan view of the bottom cover forming a part of the container;

FIGURE 9 is a bottom view of the means for making electrical contact with the light bulbs;

FIGURE 10 is an enlarged cross-sectional view of one of the light bulbs and lamp bulb socket used in connection with this invention;

FIGURE 11 is a partial perspective view of a portion of the check list device formed in accordance with the second teaching of this invention;

FIGURE 12 is a perspective view of a portion of the main panel showing the lettering formed directly on said panel;

FIGURE 13 is a cross-sectional view taken along line 13—13 of FIGURE 11 and looking in the direction of the arrows;

FIGURE 14 is an elevational cross-sectional view of the check list device shown in FIGURE 11; and FIGURE 15 is a side view of a schematic showing of the electrtoluminescent device used in the check list device of FIGURE 11.

Turning now to the drawings and particularly the embodiment shown in FIGURES 1–10, inclusive, it can be seen that the check list device is indicated in its entirety as 10 and comprises a container 12 having a bottom member 14 and a top cover member 16. The cover member 16 telescopes over the bottom member in the conventional manner and both are held together by any suitable means such as threaded fastener means 18 to form the box-like container for enclosing the parts forming the check list device. The top of the cover member 16 is provided with a large opening 19 to expose the check list items to view.

To form the columns or lists of reminder items, a relatively thick rectangularly-shaped panel or plate 20 is formed of translucent material, preferably plastic, and of a size to fit within the side walls of the container. The mounting panel 20 is provided on its front face with a plurality of horizontal grooves 22 of a tongue and groove configuration, as clearly illustrated in FIGURES 2 and 3, in order to receive complementary tongue and grooved insert members 24. These insert members 24, in the embodiment illustrated, are disposed in pairs in horizontal grooves 22 so as to provide adjacent vertical columns of reminder items as seen in FIGURE 1. These insert members are conventionally formed by providing a relatively thick layer 26 of translucent material and an outer layer 28 of opaque material such as black vinyl separated by a light reflective translucent material such as white vinyl in the form of a relatively thin layer 30. The opaque material is cut or etched to form the indicia or lettering by exposing the light reflective translucent material 30 as illustrated at 31 in FIGURE 5 so that the indicia or lettering may be seen in the day by reflective light shining upon the vinyl material 30 and may be seen at night by the illumination behind the mounting panel 20 which passes light through the insert member and through the indicia or lettering.

Turning now again to FIGURES 1 and 3, it can be seen that there is a cover plate 32 preferably of metal and of a shape to be received within the top cover 16 and lie over the mounting panel 20. This cover plate 32 is provided with a plurality of horizontal slots 34 of a width sufficient to expose the lettering on the inserts and of a length sufficient to expose two adjacent horizontal inserts to view through the container opening 19. Manually operable, slidable tabs or cover means 36 are mounted in sliding relationship in each of the slots 34, which tabs are of a length sufficient to cover one reminder item of the adjacent inserts and slidable back and forth in the slot 34 to alternately cover one of the inserts in one of the columns. These tabs are provided with a raised center portion 38 to provide a means by which the pilot may conveniently move the tabs back and forth in the slots 34. To maintain the slidable tabs in one column or the other once moved there by hand, adjacent pairs of these slidable tabs are spring biased by a relatively flat spring plate 40 having a central boss or indentation 42 throughout its length which acts as a detent to maintain the tabs in one column or the other.

As can be seen in FIGURE 6, this spring plate 40 is provided with a plurality of slots 44 which define the transverse webs 46, which webs are relatively narrow and when assembled in the container do not interfere with the visibility of the inserts, yet are sufficiently wide to engage vertically adjacent slidable tabs to hold them in their places. It is noted in FIGURE 4 that the spring plate 40 is wide enough to be held in resilient engagement with inwardly directed flanges 48 formed on the cover plate 32, and the bias of spring plate 40, while sufficiently strong to hold the slidable tabs in their respective columns, may still be manually overcome relatively easily to move the slides back and forth between adjacent columns.

To illuminate the translucent mounting panel 20, a suitable light source is provided behind the mounting panel 20 and to describe this, attention is now directed to FIGURES 7–10, inclusive.

FIGURE 8 shows a plurality of openings 50 forming part of a plurality of lamp sockets, indicated in their entirety as 52, in which suitable small lamps 54 are contained. Lamps 54 extend through the back cover 14 and through the connector plate 56 so as to illuminate the mounting panel 20 evenly and completely. To space the mounting panel 20 from the back cover 14, suitable spacers 58 are provided. These spacers may be in the form of plastic strips of sufficient thickness to provide the proper spacing or may be formed of a relatively large panel with a large central opening to permit the light from the lamps to shine on the mounting panel.

As can be seen in FIGURES 7–10, inclusive, the connector plate 56 comprises a layer 60 of suitable insulating material, such as plastic or plastic impregnated fiberboard, to separate two conductive layers 62 and 64 of copper so that electrical current can be supplied to the lamps 54. This is accomplished by having one flat contact 66 of the connector 68 connecting layer 64 to a suitable electrical conductor through prong 70 and by having a cylindrical plug-in portion 72 with its contact 74 of the conductor 68 engaging layer 62 to connect the latter to a supply of electrical current. Since the electrical connector 68 is disclosed and claimed in the United States Patent No. 3,082,395 entitled "Electrical Connector for Illuminated Panel" which issued Mar. 19, 1963 to Leslie E. Madansky, and to which reference is directed, no further description of the connector is deemed necessary herein.

Turning now to FIGURE 10, it can be seen that the inner conductive layer 64 is electrically connected to the contact 75 which, in turn, is connected to the ferrule 76 of the lamp through threaded conductor 78 which forms part of the lamp socket. It also can be seen that layer 62 is in electrical contact with the outer bottom member 14 to form a ground for the outer parts 79 and 80 forming part of the lamp socket 52 which, in turn, conduct current to the end contact (not shown) to light the lamp 54. To insure that proper electrical contact is formed between the bottom member 14 and the layer 62, the layer 56 and the cover may be scraped clean of any paint or the like near an area of contact such as at 81 where the lamp socket is threaded in so as to take advantage of the clamping action of threads of the lamp sockets in that area. Again, since the lamp sockets are described and claimed in an application of Leslie E. Madansky for United States Letters Patent, Ser. No. 201,414 filed June 11, 1962, entitled "Lamp Assembly for Edge-Lighted Panel," no further description is deemed necessary herein.

Finally, in connection with the embodiment shown in FIGURES 1–10, inclusive, it should be pointed out that the bottom cover member 14 is provided with a plurality of screw receptors 82 loosely but permanently fitted to said bottom member 14 to receive screws to fasten the check list device to an instrument panel. In addition, it should be noted that the top cover member 16 and bottom cover member 14 being removably secured together by the fasteners 18 to contain the above described parts of the check list device, to change or replace the reminder items in the mounting panel it is simply necessary to remove the top cover and cover panel 32 for access to the mounting panel without removing the entire device from the instrument panel.

Referring now to FIGURES 11–15, inclusive, it can be seen that a second embodiment of the invention is therein disclosed. In this embodiment, the container 12a encloses a cover plate 32a and a plurality of slidable tabs 36a spring actuated by the same type of spring plate 40a mounted behind the cover plate 32a to function in the same manner as previously described in connection with the embodiment shown in FIGURES 1–10, inclusive.

In this embodiment, however, the panel 20a, instead of being provided with a plurality of horizontal grooves to receive inserts, is formed with the reminder items lettered directly on the outer surface of the main panel in columns which are similar to the columns described in connection with FIGURES 1–10, inclusive. This lettering may be formed by etching or cutting an outer opaque layer 28a of vinyl to expose a translucent light-reflective layer 30a of vinyl which will be illuminated when the thick translucent back layer 24a is illuminated. This lettering may also be formed by a method of fabricating a panel as described and claimed in an application Ser. No. 201,425 filed June 11, 1962 by Leslie E. Madansky and entitled "Method of Fabricating Edge-Lighted Panels" to which reference is made. In this latter case, however, the layers 28a and 30a would be respectively black (or opaque) and white (or translucent) epoxy (light reflective) layers backed by a thick layer of methyl methacrylate, commonly sold under the trade names "Plexiglas" and "Lucite."

To illuminate the panel 20a, the panel 20a has laminated thereto a light source in the form of an electroluminescent device, indicated in its entirety as 90, and illustrated schematically in FIGURE 15. Electroluminescent devices 90 are presently available commercially and conventionally comprise a layer 92 of aluminum foil, a layer 94 of phosphorescent material, and a layer 96 of transparent conductive material such as tin fluoride; all of which are preferably encased in a thin cover of "Teflon." The layers 92 and 96 are suitably provided with connectors such as a relatively narrow layer 98 of copper foil attached to the aluminum layer and a bead or rivet 100 attached to the transparent layer so as to be connected to a suitable source of A.C. current which causes the layer 94 of phosphorescent material to glow, illuminating the translucent material and the lettering forming the check list items.

Turning now to the sectional views depicted in FIGURES 13 and 14, it can be seen that the panel 20a and its laminated electroluminescent device 90 are disposed in the container 12a in close proximity to the back cover plate 14a. Back cover plate 14a is spaced from the electroluminescent device 90 by a relatively thin spacer member 102 which is thick enough to accommodate wiring 104 from the connector 68a, which connector may be of the type described and claimed in the above identified Madansky Patent 3,082,395 and which electrically connects the electroluminescent device 90 to a suitable source of power. Back cover plate 14a differs from the back member 14 of the embodiment shown in FIGURES 1–10, inclusive, in that plate 14a has no flanges, but is flat and held in place by the inwardly extending flanges 108 formed on three sides of the cover member 16a.

It is to be noted that the cover member 16a is also provided with a flap or cover 110 at its top or unflanged edge and hinged as at 111 to permit the removal of the panel 20a and its electroluminescent device 90 so that the check list reminder items may be changed or the panel and electroluminescent device replaced if desired. The wiring 104, it can be seen, is connected at the lower end of the electroluminescent device 90 while the connector 68a is located near the top of the back plate 14a to accommodate withdrawal of the panel 20a and its electroluminescent device 90. In this manner, the panel 20a can be worked on without removal of the entire device from the instrument panel to which it is attached by the fasteners comprising screw receptors 80a and screws in a manner similar to that described in connection with the embodiment shown in FIGURES 1–10, inclusive. It can be appreciated that the panel 20a and electroluminescent device 90 are made to fit within the container 12a so that when inserted therein, they may be properly indexed so that the lettering forming the reminder items of the check list will be in their proper position.

From the foregoing description, it can be seen that a check list device with its columns of reminder items, such as illustrated in FIGURES 1 and 11, form a check list for landing and take-off procedures. For example, in these figures, the take-off check list is in the left hand column and the landing check list is in the right hand column, and at the proper time, the pilot simply slides the slidable tabs 36a from one column to the other as he runs through the check list.

It can be appreciated also that the pilot can become immediately aware of any of the items which have been overlooked simply at a glance because of the position of the tab. For example, in FIGURE 1 it can be seen that all of the landing items to be checked have been made except one, which tab remains in the take-off column giving the pilot immediate warning that one of the items has been overlooked. It should also be noted, as mentioned above as an important feature of this invention, the check list is immediately ready for the next procedure. For example, in FIGURE 1 the check list is ready for take-off procedures the next time the aircraft is flown.

Finally, it should be pointed out that while the source of light in the form of light bulbs was described in connection with the embodiment of FIGURES 1–10, inclusive, the electroluminescent device 90 could be laminated to the mounting plate 20 to serve as its light source. This, of course, would permit the container 12 to be thinner. Similarly, light bulbs could be used as a light source for the panel 20a in the embodiment of FIGURES 11–15, inclusive, provided, of course, the container 12a was made thicker to space the bulbs from the panel 20a to effectively light the panel evenly.

While only two embodiments of the present invention are disclosed and described herein, it will be readily apparent to persons skilled in the art that numerous changes and modifications may be made without departing from the scope of the invention. Accordingly, the foregoing disclosure and description thereof are for illustrative purposes only and do not in any way limit the invention which is defined only by the claims which follow.

What is claimed is:

1. A check list device for aiding an aircraft pilot in take-off and landing procedures, comprising:
   a container,
   a panel in said container,
   said container having one side open to expose said panel,
   landing and take-off reminders on said panel and exposed to view to comprise a list of items to be checked off for correct landing and take-off procedures,
   said reminder items being disposed in vertical columns with landing check-off reminders in one column and take-off reminders in another column,
   a second panel disposed over said first mentioned panel and provided with horizontal slots of a width sufficient to expose the indicia forming said reminder items and of a length to expose the reminder items of adjacent columns, and
   manually slidable means disposed in said slots to cover said reminder items individually in each column and slidable between said columns to alternatively cover and uncover the individual items for check-off procedures for landing as listed in one column and the items for check-off procedures for take-off as listed in the other column.

2. The check list device as claimed in claim 1, wherein means are provided for illuminating said reminder items so that said items will be visible in darkness.

3. The check list device as claimed in claim 2, wherein one side of said container is removable so that said first panel may be removed for correction or replacement.

4. The check list device as claimed in claim 1, wherein said first panel is provided with horizontal grooves which correspond in number and spacing to the slots in said second panel and wherein said reminder items are formed on removable inserts disposed in said horizontal grooves.

5. The check list device as claimed in claim 4, wherein means are provided for mechanically and electrically connecting said check list device to an aircraft instrument panel.

6. In a device of the character described to aid a pilot of an airplane in checking off a first plurality of steps to be taken in preparation for take-off and subsequently to aid the pilot in checking off a second plurality of steps in preparation for landing, the combination of:
   a support means,
   a first row of indicia on the support means representing the first plurality of steps,
   a second row of indicia beside the first row representing the second plurality of steps, the indicia of the two rows being paired in side by side relationship,
   a plurality of cover means corresponding to the plurality of pairs of indicia, each of said cover means being manually movable between a first position covering and concealing an indicia in the first row and a second position covering and concealing the indicia paired therewith in the second row,
   whereby the second position of the cover means indicates completion of the step represented by the corresponding indicia in the first row and the first position of the cover means indicates completion of the step represented by the corresponding indicia in the second row,
   said cover means in their second positions forming a row beside the first row of indicia and concealing the indicia of the second row whereby completion of the row of second positions of the cover means indicates completion of all of the first plurality of steps to prepare for take-off, said cover means in their first positions forming a row beside the second row of indicia and concealing the indicia of the first row whereby completion of the first row of positions of the cover means indicates completion of all of the second plurality of steps to prepare for landing, and
   detent means to releasably retain the closure means in their alternate positions respectively to prevent displacement of the closure means out of their alternate positions by vibration or inertia forces incidental to operation of the airplane, said detent means comprising a series of detent elements with the two endmost detent elements of the series positioned to cooperate with the two endmost closure means respectively and with the intermediate detent elements in the series in overlapping relation to two successive closure means to cooperate with the two successive closure means, whereby two of the detent elements cooperate with each of the closure means.

7. A combination as set forth in claim 6 in which said series of detent elements are in the form of leaf springs.

8. A combination as set forth in claim 7 in which each of said leaf springs has a central detent offset positioned to engage one end of the corresponding cover means when the cover means is in one of its two alternate positions and to engage the other end of the cover means when the cover means is in its other of its two alternate positions.

References Cited

UNITED STATES PATENTS

| | | | |
|---|---|---|---|
| 499,517 | 6/1893 | Carrington | 40—62 |
| 1,570,884 | 1/1926 | Ford | 40—62 |
| 2,497,285 | 2/1950 | Allardice | 40—62 |
| 3,292,284 | 12/1966 | Manzo | 40—62 |

FOREIGN PATENTS

| | | |
|---|---|---|
| 641,055 | 4/1928 | France. |
| 7,812 | 3/1910 | Great Britain. |

EUGENE R. CAPOZIO, *Primary Examiner.*

W. J. CONTRERAS, *Assistant Examiner.*